(12) United States Patent
Tao et al.

(10) Patent No.: US 7,131,708 B2
(45) Date of Patent: Nov. 7, 2006

(54) COORDINATED REGENERATIVE AND ENGINE RETARD BRAKING FOR A HYBRID VEHICLE

(75) Inventors: Xuefeng T. Tao, Northville, MI (US); Gregory A. Hubbard, Brighton, MI (US); Tung-Ming Hsieh, Carmel, IN (US); Anthony H. Heap, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/845,994

(22) Filed: May 14, 2004

(65) Prior Publication Data
US 2005/0255965 A1 Nov. 17, 2005

(51) Int. Cl.
*B60T 8/64* (2006.01)
(52) U.S. Cl. .................................................. 303/152
(58) Field of Classification Search ............... 303/152; 477/5, 37
See application file for complete search history.

(56) References Cited

U.S. PATENT DOCUMENTS

| | | | |
|---|---|---|---|
| 5,890,982 A | 4/1999 | Meyerle | |
| 6,161,641 A | 12/2000 | Fukumura et al. | |
| 6,813,553 B1 | 11/2004 | Nakamura et al. | |
| 7,001,306 B1 | 2/2006 | Suzuki | |
| 2001/0020554 A1* | 9/2001 | Yanasse et al. | 180/65.3 |
| 2003/0042054 A1* | 3/2003 | Matsubara et al. | 180/65.2 |
| 2003/0098185 A1 | 5/2003 | Komeda et al. | |
| 2003/0102175 A1* | 6/2003 | Wakashiro et al. | 180/65.4 |
| 2005/0090365 A1* | 4/2005 | Tamai et al. | 477/5 |
| 2005/0151420 A1 | 7/2005 | Combrez et al. | |

* cited by examiner

*Primary Examiner*—Devon Kramer
(74) *Attorney, Agent, or Firm*—Christopher DeVries

(57) ABSTRACT

A hybrid vehicle includes a powertrain having a retarded diesel engine, an electric machine and energy storage system. The engine and motor are operatively coupled through one or more planetary gearsets and selective coupling paths in accordance with application and release of various torque transfer devices to a drivetrain via an output. Regenerative and retarded engine braking are coordinated to provide priority to energy return to an energy storage system in accordance with predetermined power flow limits. Power flow in excess of the limits are handled by increased engine retard braking contributions via engine speed increases.

9 Claims, 3 Drawing Sheets

COORDINATED REGENERATIVE AND ENGINE RETARD BRAKING FOR A HYBRID VEHICLE

CROSS-REFERENCE TO RELATED APPLICATIONS

This application is related to co-pending and commonly assigned U. S. patent application Ser. No. 10/846,001 entitled "ENGINE RETARD OPERATION SCHEDULING AND MANAGEMENT IN A HYBRID VEHICLE" filed on even date herewith and incorporated herein by reference.

TECHNICAL FIELD

The present invention is related to hybrid vehicular powertrains. More particularly, the present invention is concerned with vehicle braking management in such powertrains.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

Hybrid powertrains generally rely upon a mechanically operatively decoupled accelerator pedal in determining the propulsion torque request from the vehicle operator, which propulsion torque may be delivered in various contributory splits from the internal combustion engine and the electric machine(s). Similarly, hybrid powertrains may provide all or a portion of braking torque by controlling regenerative operation of the transmission electric machine(s) or by controlling the electric machines in a fashion to transfer vehicle kinetic energy to the engine and dissipate that energy via engine or exhaust braking (engine retard braking) in response to operator braking requests. Hybrid powertrains, therefore, are generally responsive to both accelerator pedal and service brake pedal requests to provide output torque in accordance therewith.

Generally, it is desirable to recover as much kinetic energy from a vehicle braking event as practical by converting to electrical energy to be returned to the electrical energy storage system of the hybrid vehicle. However, even under ideal conditions, the substantial power flows represented by decelerating a massive vehicle may not be able to be accommodated by the energy storage system. Attempting to return too much energy, or returning energy at power flows in excess of the reasonable capacity of the energy storage system to accept same, may result in irreparable harm to the energy storage system. Known regenerative braking systems therefore are generally calibrated rather conservatively to avoid damage to the energy storage system. Furthermore, for other reasons, it may be desirable to limit the power flow into the energy storage system even if its capacity to accept more energy and higher power flow is not limited by such damage considerations. Therefore, even with conservative calibrations, a regenerative braking system may not provide optimum energy return and power flow to the energy storage system in accordance with other desirable objectives.

Engine retard braking has been practiced to dissipate vehicle deceleration energy in conventional powertrain equipped vehicles. Such braking is most desirable with heavy vehicles, particularly when grade descending, to significantly enhance and minimize the need for service brake application. However, engine retard braking has conventionally been employed in a substantially uncontrolled fashion at the request of the vehicle driver in accordance with actuation of the engine braking or exhaust braking mechanism and gear ratio selection. In a hybrid powertrain equipped vehicle, such non-ideal application of engine retard braking may supplant the need for regenerative braking and forgo the significant efficiency gains that might otherwise be effected by returning the dissipated engine retarding energy to the energy storage system. Furthermore, such non-ideal and unpredictable application of engine retard braking frustrates the objective of returning regenerative braking energy in a controlled fashion to the energy storage system.

Therefore, it is desirable to coordinate control of both regenerative braking and engine retard braking in a hybrid vehicle.

SUMMARY OF THE INVENTION

A vehicle includes a hybrid powertrain having a retarded diesel engine, such as by an exhaust brake or an engine compression brake, and at least one electric machine and a battery pack. The diesel engine and electric machine are operatively coupled to a driveline having an output in accordance with known speed relationships between the diesel engine, the electric machine and output, wherein the output power is substantially equivalent to the summation of engine power and the electric machine power. In accordance with the invention, coordination of regenerative braking and engine retard braking of a vehicle includes providing a vehicle braking request, such as by interpreted operator brake pedal effort. A first braking contribution to the output is provided by the electric machine, and a second braking contribution to the output is provided by the retarded engine. Engine speed is controlled higher when power flow to the energy storage system exceeds a predetermined power limit. This effectively increases the engine retard braking contribution and decreases the regenerative braking contribution in order to meet a given driver braking request. Engine speed is controlled lower when power flow to the battery pack does not exceed the predetermined power limit. This effectively decreases the engine retard braking contribution and increases the regenerative braking contribution. Vehicle braking contribution priority is first to said at least one electric machine and second to said retarded engine. Where battery power limits are not tight and power flow into the battery pack is acceptable, the engine speed may be determined in accordance with one of a battery difference which is a measured difference between actual battery power and a predetermined limit, and an output difference which is a measure of the difference between the output torque requested and the output torque commanded. Where battery power limits are tight, the engine speed may be determined solely in accordance with the output difference. Insignificant output difference results in engine speed setting in accordance with a predetermined calibration rate whereas significant output difference results in engine speed setting determined in accordance with the output difference.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
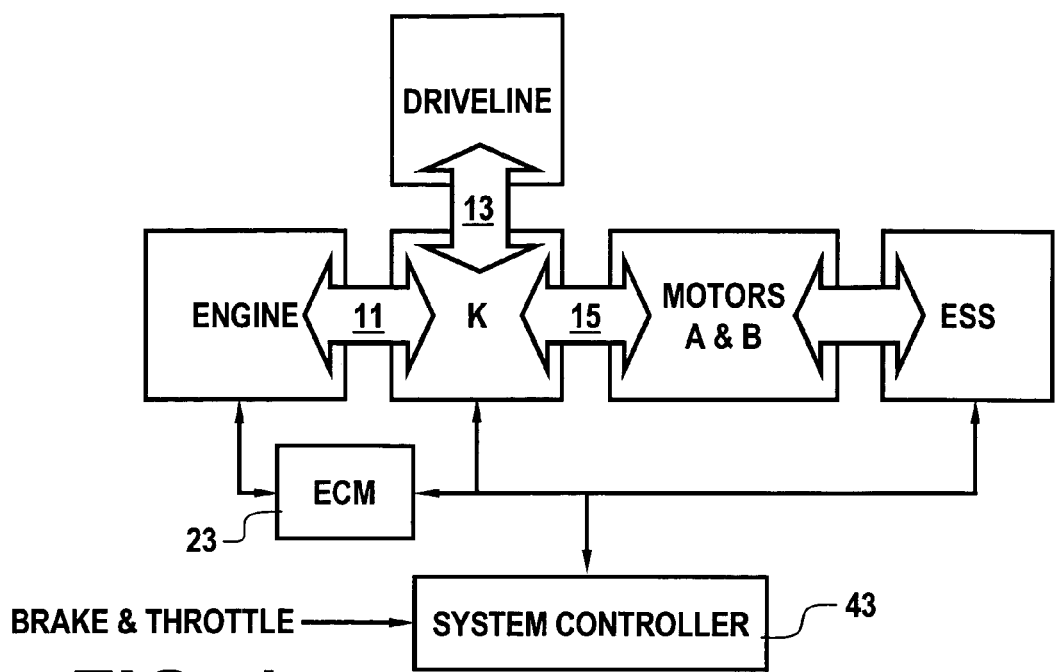
FIG. 1 is a block diagram of hybrid vehicle powertrain in accordance with the present invention.

With reference first to FIG. 1, a block diagram of an exemplary hybrid powertrain to which the present coordinated control of electrically regenerative and engine retard braking is applicable is illustrated. A hybrid powertrain includes a diesel compression ignition engine, a vehicle driveline and one or more electric motors (hereafter motor) operatively coupled to one another, for example, through a coupling means (K) comprising one or more planetary gearsets and selective coupling paths in accordance with application and release of various torque transfer devices. The engine is coupled to the coupling means at a mechanical input thereof (11). The driveline is coupled to the coupling means at a mechanical output thereof (13). The motor is coupled to the coupling means at an input thereof (15). Neglecting power losses, the power flows between the engine, driveline and motor balance. And, the power at the driveline is equivalent to the summation of the powers at the engine and motor. Engine, driveline and motor torques follow the same relationships and are known through the various gearsets, power transmission components and the relationships therebetween as embodied in coupling constraint relationships. Speed relationships between the engine, driveline and motor are also known through the various gearsets, power transmission components and the relationships therebetween as embodied in coupling constraint relationships. The vehicle driveline may include such common driveline components as differential gearsets, propshafts, universal joints, final drive gearsets, wheels and tires. The electric motor receives electric power from and provides electric power to an energy storage system (ESS) which may take the form of one or more batteries in a battery pack module or any appropriate energy storage means capable of bidirectional electrical energy flow. Engine, driveline and motor torques may be in either direction. That is to say, each is capable of bidirectional torque contributions to the powertrain. An exemplary diesel hybrid powertrain comprising a pair of electric motors and a pair of selectively coupled planetary gearsets arranged as a multi-mode, compound-split, electrically variable transmission is disclosed in commonly assigned U.S. Pat. No. 5,931,757, the contents of which are incorporated herein by reference.

The exemplary powertrain of FIG. 1 also includes a microprocessor based system controller 43 that communicates with the engine via a conventional microprocessor based engine controller (ECM) 23. The engine controller preferably communicates with the system controller 43 over a controller area network (CAN) bus. The CAN bus allows for communication of control parameters and commands between various modules. The specific communication protocol utilized will be application specific. For example the preferred protocol for heavy duty applications is the Society of Automotive Engineers standard J1939. The engine controller, in turn, is adapted to communicate with various engine actuators and sensors (not separately illustrated) used in the control thereof. For example, fuel injectors, exhaust brake or engine compression brake actuators and rotation sensors are controlled or monitored by discrete signal lines at the engine controller. The system controller 43 communicates with various coupling means actuators and sensors used in the control thereof. For example, output rotation sensors and solenoid control valves for controlling torque transfer device hydraulic pressure and apply/release states and hydraulic fluid pressure transducers are controlled or monitored by discrete signal lines. Additionally, the system controller 43 communicates similarly with a microprocessor based battery pack controller and microprocessor based power electronics controller (not separately illustrated), collectively referred to as ESS controllers. These ESS controllers preferably communicate with the system controller 43 over a CAN bus. The ESS controllers, in turn, are adapted to provide a variety of sensing, diagnostic and control functions related to the battery pack and motor. For example, current and voltage sensors, temperature sensors, multiphase inverter electronics and motor rotation sensors are controlled or monitored by the ESS controllers.

Powertrain control has the general objective of meeting the operator torque request. In a propulsion mode of operation wherein positive output torque is requested, this control is preferably accomplished in accordance with selected engine torque and speed operating points in accordance with predetermined criteria, including system efficiency objectives. Engine torque control is handled by the engine controller in accordance with a commanded engine torque, Te_cmd, determined by the system controller, and engine speed control is handled by a speed control directed through the control of electric motor torque. Preferred methods for determining engine speed and engine torque and controlling engine speed are disclosed in commonly assigned and co-pending U.S. Ser. Nos. 10/686,511, 10/686,508 10/686,034 and 10/799,531 which are all incorporated herein by reference. Generally, system controller 43 determines a commanded output torque, To_cmd, for use in the control of the powertrain. The determination of To_cmd is made based upon operator input factors such as throttle pedal position and brake pedal effort and vehicle dynamic conditions such as vehicle speed. Other operator input factors such as shift selector position and power take-off requests, vehicle dynamic conditions such as acceleration and deceleration rate, and other operational conditions such as temperatures, voltages, currents and member speeds may also influence the determination of output torque. System controller 43 also determines the constitution of the output torque in terms of engine and electric machine contributions and splits. The powertrain propulsion controls are adapted in the present invention operating in the negative torque domain through provision of engine torque operating scaling points in accordance with know retarded engine torque characteristics across engine speeds and provision of engine speed operating points determined in accordance with the present invention.

The present invention is concerned with operation of the vehicle in a manner in which no propulsion torque is provided to the output and further wherein the driveline torque is driving the motor and/or engine through the coupling means, K. At a minimum, this corresponds generally to a released throttle pedal with or without some degree or level of brake pedal effort. Throttle pedal position and brake effort signals are also monitored by system controller 43. Brake effort may, for example, be provided in pneumatic and hydraulic braking systems from conventional pressure transducers (not shown). Throttle position may, for example, be provided by conventional displacement sensors for transducing throttle pedal travel.

Throttle and brake requests are filtered and conditioned from throttle position and brake system pressure sensors, respectively. Preferably the request signals are scaled and available in a normalized range of 0 to 100 representing the percentage of a full request. For example, a completely depressed throttle pedal would result in a throttle request signal equivalent to 100, whereas an operator stepping completely off of the throttle pedal would result in a throttle request signal equivalent to 0. For purposes of the present coordinated brake control, the brake request is scaled within a relatively early region of application pressures corresponding to a region of braking output torque for which the coordinated control is applicable. No service brake pedal effort results in a brake request signal of 0 with increasing service brake pedal efforts resulting in increasing brake request signals up to a maximum of 100 in accordance with system calibrations. Within this early region of service brake pedal effort, no or minimal service brake application via the vehicular pneumatically or hydraulically applied friction brakes is effected. Increases in brake pedal effort beyond the maximum of 100 in this earliest region brake pedal effort results in increasing application of the pneumatically or hydraulically applied friction brakes.

Figure 2:
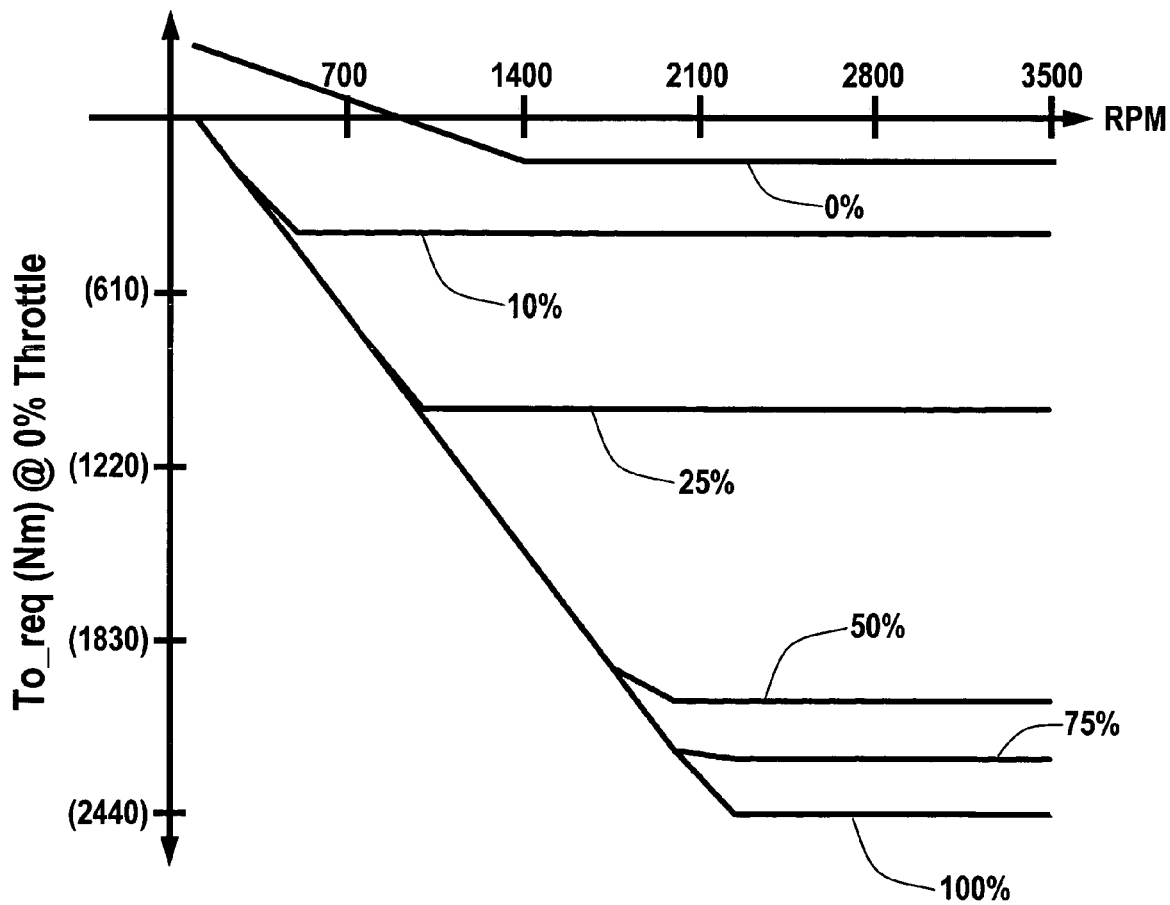
FIG. 2 is a graphical representation of resolved requested output torques at various powertrain output speeds for a variety of brake pedal actuations within a predetermined range thereof in accord with the present invention.

With reference to FIG. 2, various brake pedal lines of constant effort are illustrated and variously labeled as percentages corresponding to the scaling described herein previously. Each line represents—across a range of output speeds, No—a resolved output torque request, To_req, for use in the control of the powertrain. The output torque request, To_req, represents the total desired torque to be established at the output by the coordinated regenerative and engine retard braking.

One objective of the present coordinated control is to prioritize the braking energy path as between regeneration and engine retard with the first priority being to return as much of the braking energy to the ESS in accordance with various considerations including physical capacity to accept charge and other factors such as electrical power throughput objectives.

Figure 3:
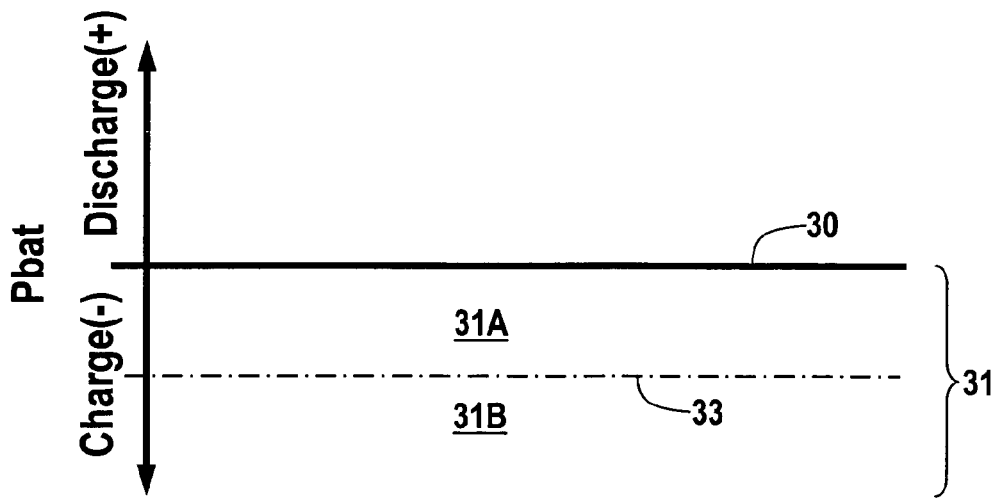
FIG. 3 is a graphical representation of energy storage system charge and discharge power regions and certain exemplary sub-regions thereof particularly related to the present invention.

With reference to FIG. 3, regions of energy storage system power flows are illustrated. Power flows are labeled as battery power, Pbat, and comprise a discharge region above the horizontal line 30 wherein net power flow is out of the battery pack and a charge region 31 below the horizontal line wherein net power flow is into of the battery pack. By chosen sign convention, charge power flow is shown as negative and discharge power flow is shown as positive. The further away from the horizontal line 30 the battery power is located, the greater the magnitude of power flow. It is the charge region 31 that is of particular interest in the coordinated control of the present invention.

With the chosen sign convention and with respect to an arbitrary power flow in the charge region, decreasing power flow refers to larger negative values. And, increasing power flow refers to smaller negative values. Similarly, with respect to an arbitrary power flow in the discharge region, decreasing power flow refers to smaller positive values. And, increasing power flow refers to larger positive values. Therefore, larger power flows into the battery pack correspond to large negative values. Similarly, larger power flows out of the battery pack correspond to larger positive values.

Discharge power limits, Pbat_max, and charge power limits, Pbat_min, are predetermined and represent maximum desired power flow out of and into the battery pack, respectively. Values for Pbat_max and Pbat_min follow the sign convention described for discharge and charge power flows. Pbat_min and Pbat_max are continually updated in accordance with a variety of physical and non-physical factors and considerations representing present charge acceptance capabilities and power flow preferences. These power limits, Pbat_min and Pbat_max, are preferably obtained from data sets stored in table form within data structures in the system controller 43. Such data sets are provided for reference by various control routines in pre-stored table format having been correlated to various conditions, e.g. state of charge, temperature, voltage and preference considerations, e.g. usage or throughput (amp-hour/hour). A preferred method of determining minimum and maximum battery power is disclosed in commonly assigned and co-pending U.S. Ser. No. 10/686,180 which is incorporated herein by reference. Pbat_max and Pbat_min generally represent acceptable limits on power flow for the battery pack and charges, and discharges located within the envelope established thereby are generally acceptable.

During a coordinated braking event in accordance with the present invention, it is generally desirable that braking energy is first returned via regeneration to the battery pack and then dissipated via engine retard braking. And, it is understood that engine retarding at higher engine speeds corresponds to higher energy dissipation, higher power and higher torques at the engine. Minimum battery power, Pbat_min, therefore serves a role in the control by establishing a threshold beyond which greater power flows into the battery pack are undesirable. The difference between actual battery power flow and Pbat_min (battery difference) is used to establish an engine speed which will establish a braking power flow to substantially converge the battery power flow to Pbat_min, i.e., drive the battery difference to zero. Thus, the optimum energy return to the battery pack can be realized and excessive power flow thereto avoided.

Additionally, the difference between the actual or commanded output torque and the requested output torque (output difference), established in accord with the brake pedal effort previously described in conjunction with FIG. 2, provides an alternative basis upon which engine speed may be determined. Such output difference is used to establish a desired retarded engine speed which will establish a braking power flow to substantially converge the output torque to the requested output torque, i.e., drive the output difference to zero. One of the battery difference or the output difference is selectively used in the determination of desired retarded engine speed in accordance with the significance of the output difference and the battery difference. Insignificant output difference would result in use of the battery difference for desired retarded engine speed determination, whereas significant output difference would result in an additional comparative selection of the one of the battery and output differences to be used in desired retarded engine speed determination.

Where Pbat_min threshold is tight, i.e., relatively small negative value (e.g. −30 kW to −150 kW in a heavy duty application), it is determined that the battery pack cannot accept significant power flow thereto and that engine retard braking in accord with the desired retarded engine speed should be established in accordance with the significance of the output difference exclusively. A tight Pbat_min threshold may be visually represented as values for Pbat_min which are generally going to be within region 31A of FIG. 3 between line 30 and tight threshold limit line 33. Line 30 corresponds to zero power flow in FIG. 3. Pbat_min is typically a negative value; however, it is possible that Pbat_min is positive and such positive values would similarly be considered tight. It follows that a Pbat_min threshold that is not tight corresponds to values for Pbat_min which are within region 31B of FIG. 3 on the opposite side of tight threshold limit line 33. When Pbat_min is tight, insignificant output differences would result in desired retarded engine speed determination effective to trend the engine speed lower. Significant output differences would result in use of the output difference for desired retarded engine speed determination.

Figure 4:
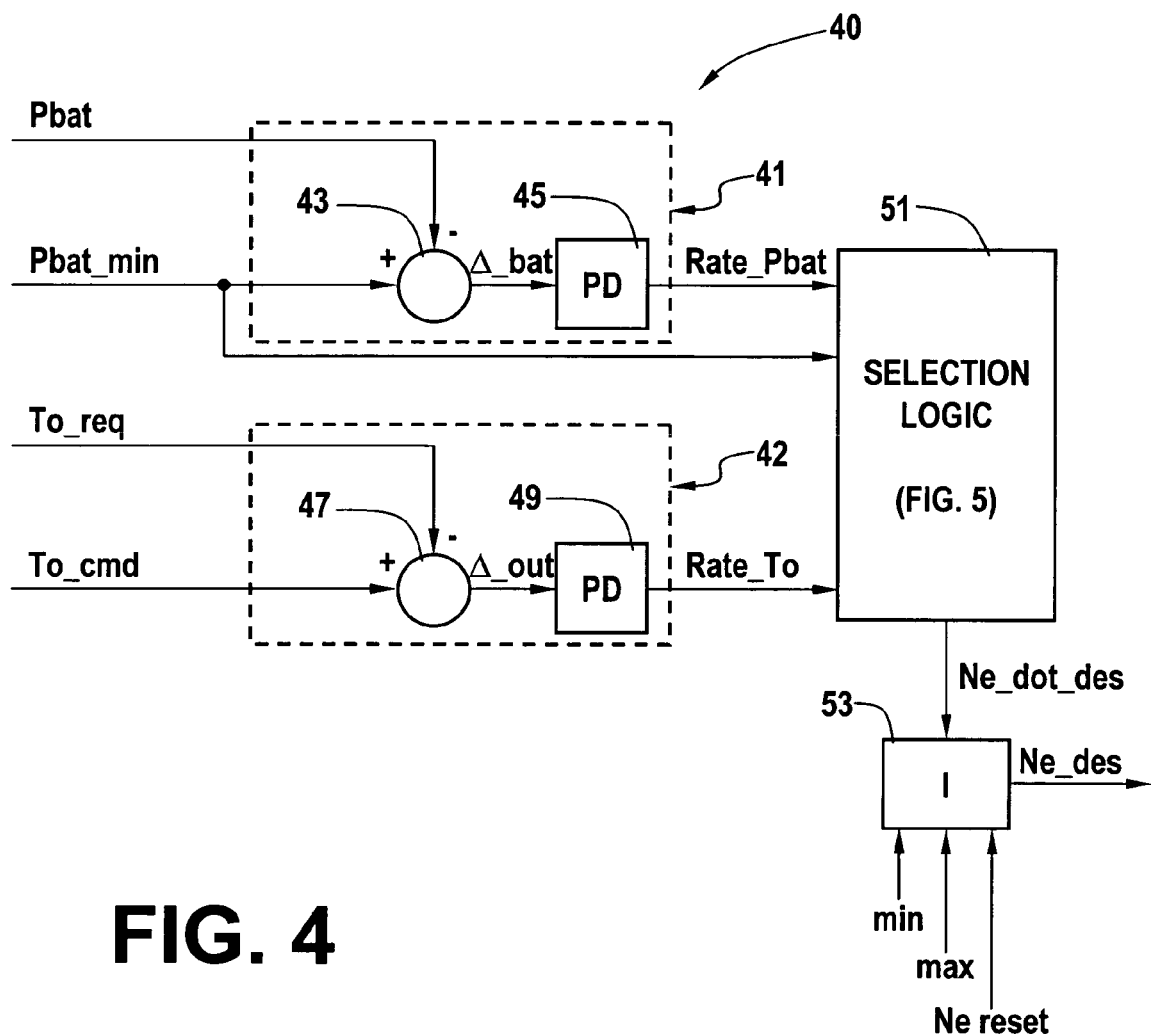
FIG. 4 is a controller block diagram of an exemplary implementation of coordinated regenerative and engine retard braking in accord with the present invention.

With reference now to FIG. 4, a preferred control block implementation of the present invention is illustrated. A first closed-loop proportional-derivative control 41 is employed to establish a first engine speed change rate, Rate_Pbat, as a function of the previously described battery difference, Δ_bat. Battery power, Pbat, which is preferably filtered with appropriate time constants if required for stability, and Pbat_min, are compared at summing node 43 to establish the battery difference, Δ_bat. Conventional PD processing 45 is performed on the difference to establish a rate substantially corresponding to an engine speed control rate which would drive the battery difference to zero in a stable fashion as well known in the art of closed loop controls. A second closed-loop proportional-derivative control 42 is employed to establish a second engine speed change rate, Rate_To, as a function of the previously described output difference, Δ_out. Requested output torque, To_req and predetermined commanded output torque, To_cmd, are compared at summing node 47 to establish the output difference, Δ_out. Conventional PD processing 49 is performed on the difference to establish a rate substantially corresponding to an engine speed control rate which would drive the output difference to zero in a stable fashion as well known in the art of closed loop controls.

The output torque command, To_cmd, is determined by considering the output torque requested, To_req. It may correspond to the torque requested by the vehicle operator in the event that the request is within the system's capabilities. But it may correspond to a constrained output torque in accordance with system limits. To_cmd may also be constrained in accordance with other factors apart from system capabilities such as vehicle driveability and stability considerations. Constraints may include engine torque maximums and minimums as determined in accordance with present operating conditions for the engine including, predominantly actual engine speed Ne. Retarded engine torque characteristics are known from conventional dynamometric testing of a motored, retarded engine (i.e., unfueled, exhaust brake or engine compression brake applied) across a range of rotational speeds. The constraints may further include motor minimum and maximum torques and minimum and maximum battery powers.

Rate_Pbat and Rate_To are provided to selection logic block 51 which is effective to provide a desired engine speed rate, Ne_dot_des, as further described herein below in conjunction with FIG. 5. Pbat_min is also provided as an input into selection logic block 51. Ne_dot_des is selected as one of Rate_Pbat and Rate_To and provided to integrator 53 to establish therefrom the desired engine speed for use in coordinated braking control in accordance with the present invention. The output of integrator 53 is subject to a minimum and maximum limit, min and max, respectively. The minimum engine speed limit provides a setting that is higher than a normal engine speed minimum limit, e.g., idle speed, during a coordinated braking event to ensure that adequate available engine braking torque for utilization in the coordinated control and is preferably provided as a calibrated value. The maximum engine speed limit is similarly preferably provided as a calibrated value in accordance with the engine manufacturer's recommendation for maximum retarded engine speed. The maximum engine speed limit may also be affected by operator setting of a shift selector position or vehicle speed wherein higher engine speed are generally more tolerable at higher vehicle speeds. Integrator 53 is also resettable to an initial engine speed, Ne, substantially at the inception of a coordinated braking control event.

Figure 5:
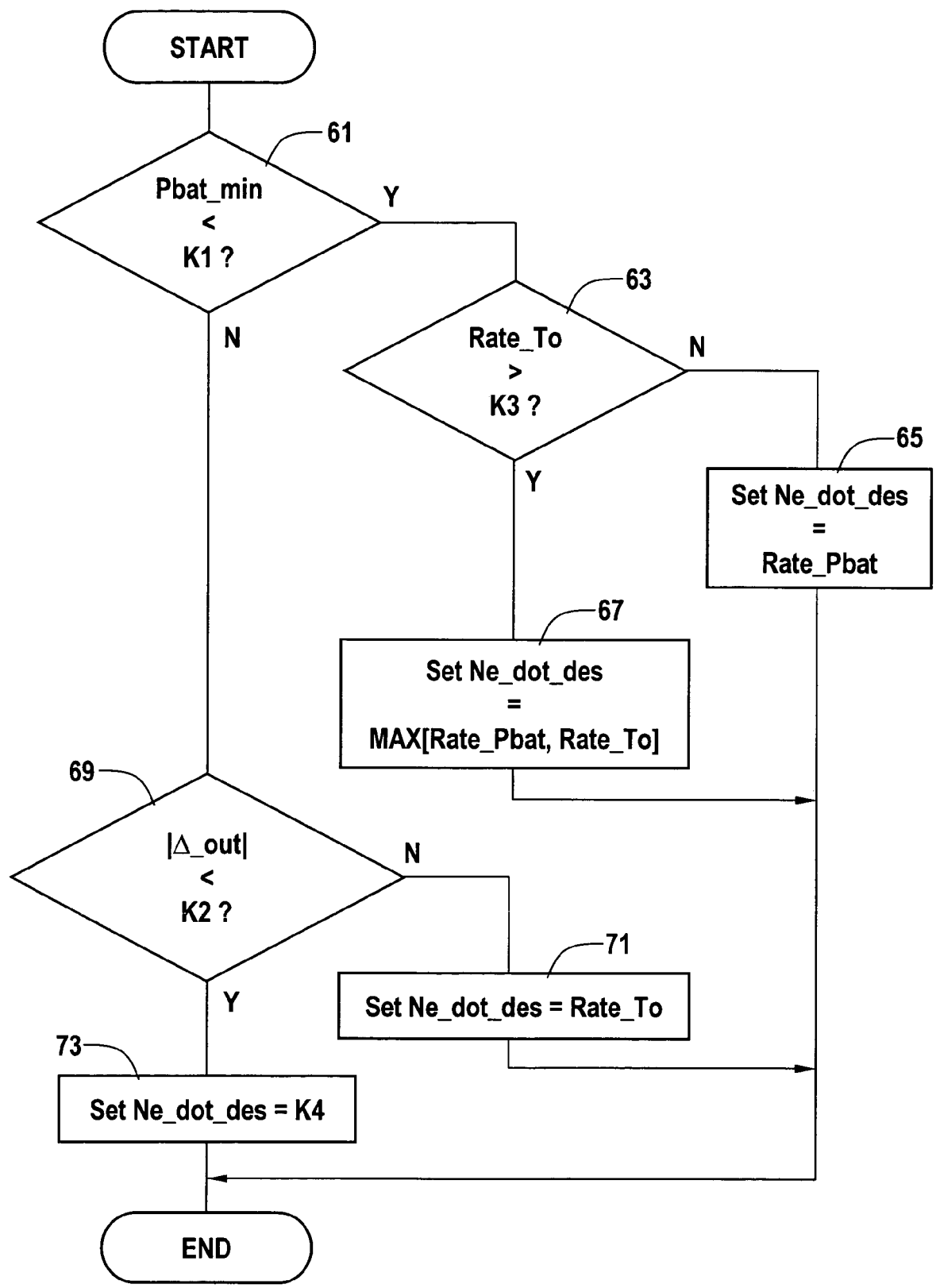
FIG. 5 is a flow chart representing a set of exemplary steps related to the selection of an engine speed for establishing engine retard braking contribution in accord with the present invention.

Turning now to FIG. 5, a flow chart illustrating exemplary steps for carrying out the functions of selection logic block 53 of the preferred control block implementation of the present invention is illustrated. At block 61, a determination is made as to whether the minimum battery power limit, Pbat_min, is tight as previously described. Where the present Pbat_min is less than a predefined threshold calibration, K1, then it is determined that the limit is not tight and the energy storage system presently is capable of accepting a normally expected amount of regenerative charge. An appropriate calibration will be established in accordance with the particular application and will essentially scale in accordance therewith. In a heavy duty application, an exemplary threshold calibration power limit may be about −20 kW to about −50 kW.

With capacity to accept charge by the energy storage system, a determination is made at step 63 relative to the output difference previously described. The output difference, however, is not directly checked. Rather, the rate established by the difference PD processing, Rate_To, is compared to a positive calibration threshold, K3. If Rate_To is not greater than K3 then it is determined that no significant output torque shortfall exists as measured by the PD processed output difference. In such a case, the battery difference, Δ_bat, is used to establish engine speed as illustrated at step 65. The battery difference, however, is not directly used. Rather, the rate established by the difference PD processing, Rate_Pbat, is selected as the desired engine speed rate, Ne_dot_des, and as described with respect to FIG. 4 is further processed by integration to establish the desired engine speed, Ne_des. Negative values of Rate_Pbat signifies battery powers that are greater than Pbat_min (smaller negative values), i.e., power flows into the battery pack below the determined capacity for the battery pack to accept charge. Positive values of Rate_Pbat signifies battery powers that are less than Pbat_min (larger negative values), i.e., power flows into the battery pack in excess of the determined capacity for the battery pack to accept charge. Rate_Pbat therefore will cause the controller to trend the engine speed lower or higher in accordance with negative and positive values, respectively, thereof.

If Rate_To is greater than K3 as established at step 63, then it is determined that a significant output torque shortfall exists as measured by the PD processed output difference. In such a case, one of the battery difference, Δ_bat, and output difference, Δ_out, is used to establish engine speed as illustrated at step 67. The differences, however, are not directly used. Rather, the rates established by the difference PD processing, Rate_Pbat or Rate_To, are selected and, as described with respect to FIG. 4, further processed by integration to establish the desired engine speed, Ne_des. The greater of the two rates, Rate_Pbat and Rate_To, is selected as the desired engine speed rate, Ne_dot_des. The selected rate therefore will cause the controller to trend the engine speed higher in accordance with the greater rate.

Where the present Pbat_min is not less than a predefined threshold calibration, K1, then it is determined that the limit is tight and the energy storage system presently has limited capacity to accept charge. With limited capacity to accept charge by the energy storage system as determined at step 61, the engine speed is established in accordance with the significance of the output difference exclusively. Significant output differences, as determined at step 69 by the absolute value thereof being not less than a threshold calibration, K2, would result in engine speed determination in accordance with the output difference, Δ_out, as illustrated at step 71. The output difference, however, is not directly used. Rather, the rate established by the difference PD processing, Rate_To, is selected as the desired engine speed rate, Ne_dot_13_des, and as described with respect to FIG. 4 is further processed by integration to establish the desired engine speed, Ne_des. Insignificant output differences, as determined at step 69 by the absolute value thereof being less than a threshold calibration, K2, indicate a substantial match between the requested and commanded output torque and no current need for increased engine retard braking. Insignificant output differences would result in engine speed determination in accordance with a calibration K4 at step 73. At step 73 the desired engine speed rate, Ne_dot_des, is set to the calibration K4 which is a negative value to effect a decreasing engine speed. A decreasing engine speed is consistent with a decelerating vehicle. The output difference, however, is not directly used. Rather, the rate established by the difference PD processing, Rate_To, is selected as the desired engine speed rate, Ne_dot_des, and as described with respect to FIG. 4 is further processed by integration to establish the desired engine speed, Ne_des.

The invention claimed is:

1. Method for coordinating regenerative and engine retard braking of a vehicle comprising a hybrid powertrain including a retarded diesel engine, at least one electric machine and an electrical energy storage system, said diesel engine and said at least one electric machine both being operatively mechanically coupled to a driveline having an output in accordance with known speed relationships between the diesel engine, said at least one electric machine and said output, wherein output power is substantially equivalent to a summation of engine power and said at least one electric machine power, comprising:
   providing a vehicle braking request;
   providing a first braking contribution to the output by said at least one electric machine;
   providing a second braking contribution to the output by said retarded engine;
   controlling an engine speed higher when power flow to the energy storage system exceeds a predetermined power limit and lower when power flow to the energy storage system does not exceed the predetermined power limit;
   whereby increasing engine speed increases the second braking contribution and decreases the first braking contribution, decreasing the engine speed decreases the second braking contribution and increases the first braking contribution, and vehicle braking contribution priority is first to said at least one electric machine and second to said retarded engine.

2. The method as claimed in claim 1 wherein controlling the engine speed comprises:
   determining a power difference between the power flow to the energy storage system and the predetermined power limit; and
   controlling engine speed changes at a first rate that is a function of the power difference.

3. The method as claimed in claim 2 further comprising:
   determining vehicle braking;
   determining a braking difference between the vehicle braking request and the vehicle braking;
   determining a second rate for controlling engine speed that is a function of the braking difference; and
   when the braking difference exceeds a predetermined difference, controlling engine speed changes at the larger of the first and second rates.

4. The method as claimed in claim 1 further comprising:
   comparing the predetermined power limit to a predetermined threshold power limit; and
   when the predetermined power limit does not exceed the predetermined threshold power limit;
   determining vehicle braking,
   determining a braking difference between the vehicle braking request and the vehicle braking,
   determining a rate for controlling engine speed that is a function of the braking difference, and
   controlling engine speed changes in accordance with the rate.

5. The method as claimed in claim 4 wherein the rate for controlling engine speed is a function of the braking difference when an absolute value of the braking difference exceeds a predetermined threshold difference and is otherwise a predetermined value effective to reduce engine speed.

6. The method as claimed in claim 3 further comprising:
   comparing the predetermined power limit to a predetermined threshold power limit; and
   when the predetermined power limit does not exceed the predetermined threshold power limit, controlling engine speed in accordance with the second rate when an absolute value of the braking difference exceeds a predetermined threshold difference and otherwise controlling engine speed in accordance with a predetermined value effective to reduce engine speed.

7. Method for determining an engine speed for power dissipation in a coordinated regenerative and engine retard braking system of a vehicle comprising a hybrid powertrain including a retarded diesel engine, at least one electric machine and an electrical energy storage system, said diesel engine and said at least one electric machine both being operatively mechanically coupled to a driveline having an output in accordance with known speed relationships between the diesel engine, said at least one electric machine and said output, wherein output power is substantially equivalent to a summation of engine power and electric machine power of said at least one electric machine, comprising:

calculating a power difference between power flow to the energy storage system and a predetermined power limit;

calculating a first rate for engine speed change as a function of the power difference;

calculating a torque difference between a requested output torque and a commanded output torque;

calculating a second rate for engine speed change as a function of the torque difference;

selecting one of said first and second rates for engine speed change; and determining an engine speed in accordance with the selected one of said first and second rates for engine speed change.

8. The method of claim 7 wherein selecting one of said first and second rates for engine speed change comprises:

during periods in which it is determined that the energy storage system is capable of accepting power above a predetermined minimum power limit, selecting the first rate when the second rate is below a predetermined threshold, and selecting the larger of the first and second rates when the second rate is not below the predetermined threshold.

9. The method of claim 8 wherein selecting one of said first and second rates for engine speed change further comprises:

during periods in which it is determined that the energy storage system is not capable of accepting power above the predetermined minimum power limit, selecting the second rate when the absolute value of the second rate exceeds a predetermined maximum difference.

* * * * *